US010584997B2

(12) United States Patent
Barnard

(10) Patent No.: US 10,584,997 B2
(45) Date of Patent: Mar. 10, 2020

(54) METHOD AND APPARATUS FOR MEASURING ILLUMINATION CHARACTERISTICS OF A LUMINAIRE

(71) Applicant: VERIZON PATENT AND LICENSING INC., Basking Ridge, NJ (US)

(72) Inventor: Chris Barnard, Sunnyvale, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 225 days.

(21) Appl. No.: 15/673,793

(22) Filed: Aug. 10, 2017

(65) Prior Publication Data

US 2017/0336253 A1    Nov. 23, 2017

Related U.S. Application Data

(62) Division of application No. 14/190,538, filed on Feb. 26, 2014, now Pat. No. 9,746,370.

(51) Int. Cl.
*G01J 1/42* (2006.01)
*G01J 1/02* (2006.01)
*H05B 33/08* (2020.01)

(52) U.S. Cl.
CPC .......... *G01J 1/4228* (2013.01); *G01J 1/0223* (2013.01); *G01J 1/0242* (2013.01);
(Continued)

(58) Field of Classification Search
CPC ...... G01J 1/4228; G01J 1/0223; G01J 1/0242; H05B 33/0845; H05B 33/0857
(Continued)

(56) References Cited

U.S. PATENT DOCUMENTS 6,614,518 B1    9/2003  Ishikawa et al.
7,822,264 B2   10/2010  Balslev et al.
(Continued)

FOREIGN PATENT DOCUMENTS

CN    202939797    5/2013
EP      1658579    5/2006
(Continued)

OTHER PUBLICATIONS

Ren, et al., "Fast-measurement on intensity spatial distribution characteristics of LED", (Guangdong Public Laboratory of Modern Control and Optics-Mechanics-Electricity Technology, Guangzhou Research Institute of Optics-Mechanics-Electricity Technology, Guangzhou 510635, China, Optical Instruments vol. 30, No. 6, 4 pages, Dec. 2008.

*Primary Examiner* — Georgia Y Epps

(57) ABSTRACT

A method and associated apparatus are disclosed for measuring illumination characteristics of a luminaire having unknown characteristics. The method includes steps of providing an array of calibrated photodetectors in known locations in proximity to a mounting location, and then illuminating the array with a luminaire having unknown illumination properties. The resulting data is used to calculate the luminous intensity vs. angle from the luminaire and the luminous flux of the luminaire. Methods of calibrating the measurement with a known luminaire are presented along with methods of determining the angular position of the detectors in the array. Color-sensitive detectors can be used to determine the angular distribution and average value of the luminaire's correlated color temperature.

15 Claims, 5 Drawing Sheets

First Embodiment of a Detector Array

(52) U.S. Cl.
CPC ..... *H05B 33/0845* (2013.01); *H05B 33/0857* (2013.01); *G01J 2001/4247* (2013.01)

(58) Field of Classification Search
USPC ..................................................... 250/208.2
See application file for complete search history.

(56) References Cited

U.S. PATENT DOCUMENTS

| | | | |
|---|---|---|---|
| 7,876,427 | B1 | 1/2011 | Waller |
| 2006/0256320 | A1 | 11/2006 | Peterson |
| 2008/0304049 | A1 | 12/2008 | Jian-Gen |
| 2013/0265570 | A1 | 10/2013 | Yoshi |
| 2014/0297227 | A1* | 10/2014 | Barnard ................. G01J 1/42 702/189 |
| 2014/0312780 | A1* | 10/2014 | Vissenberg .......... G01B 11/026 315/153 |
| 2015/0061505 | A1* | 3/2015 | Asami ................. H05B 37/0218 315/152 |

FOREIGN PATENT DOCUMENTS

| | | |
|---|---|---|
| EP | 2400559 | 12/2011 |
| EP | 2693103 | 2/2014 |

\* cited by examiner

Prior Art: Goniophotometer

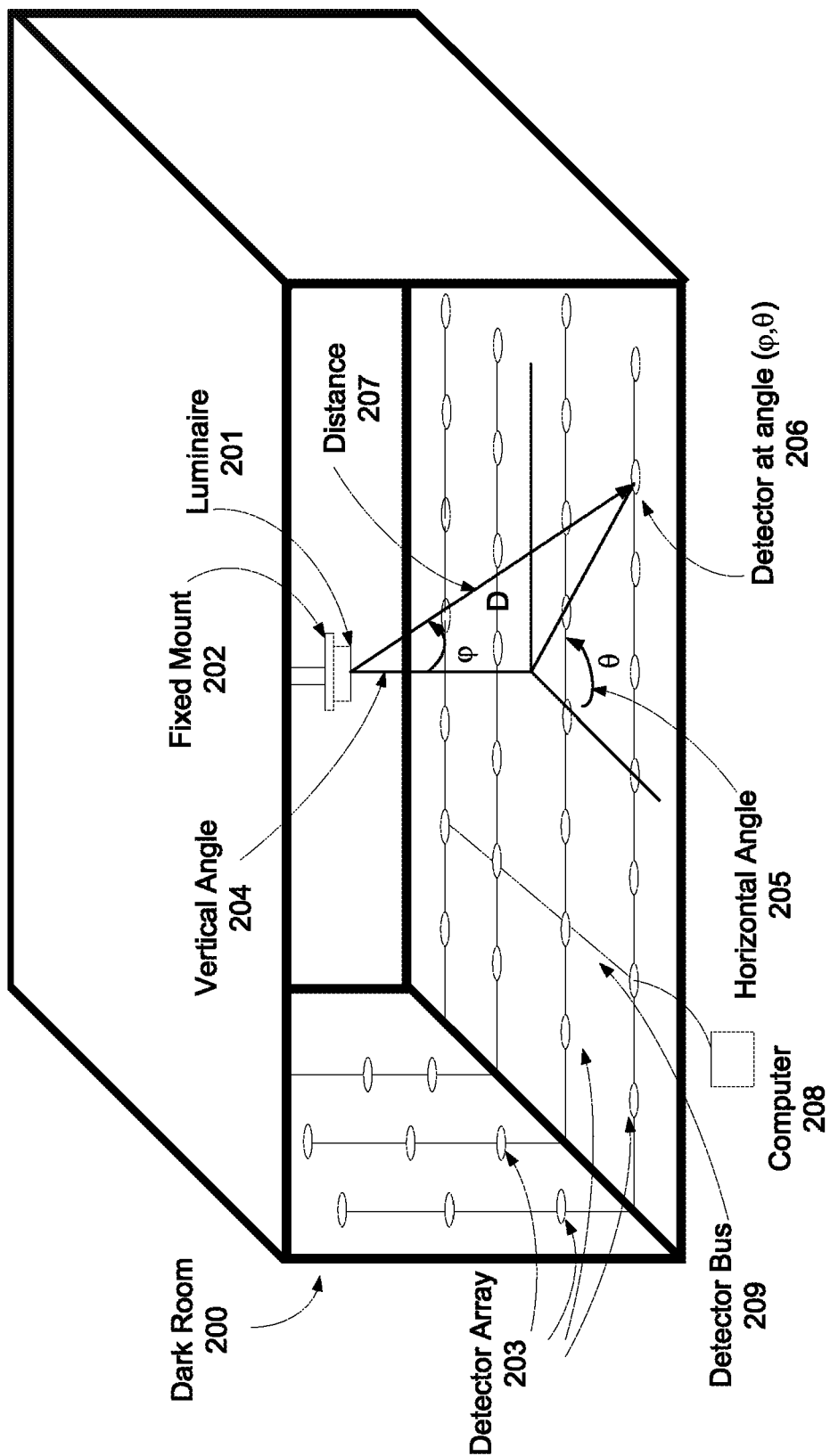
FIG. 2 First Embodiment of a Detector Array

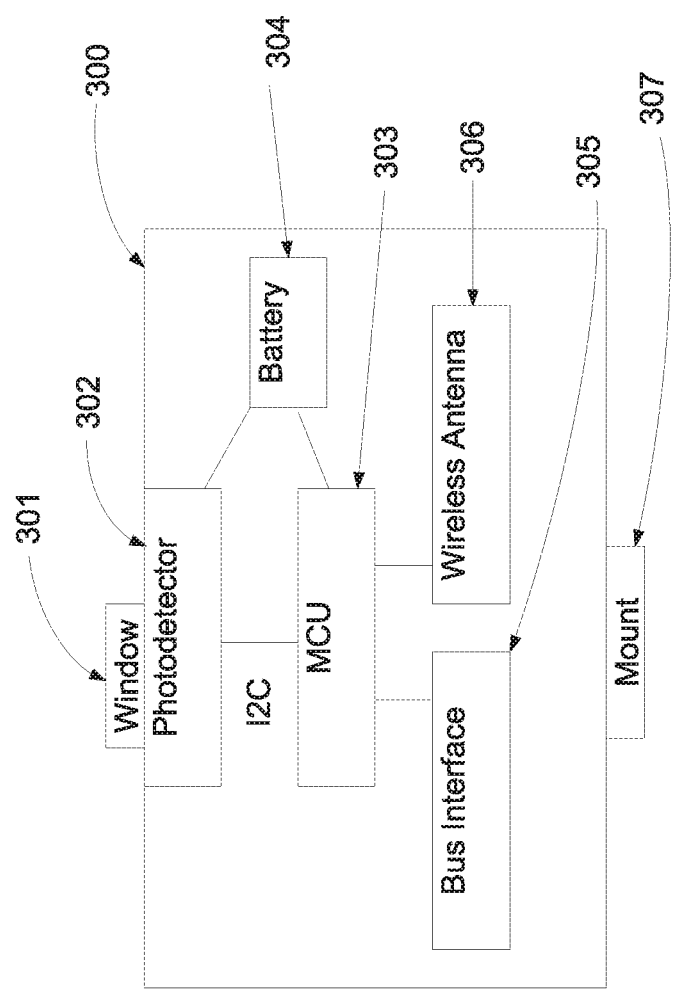
FIG. 3 Detail of detector element

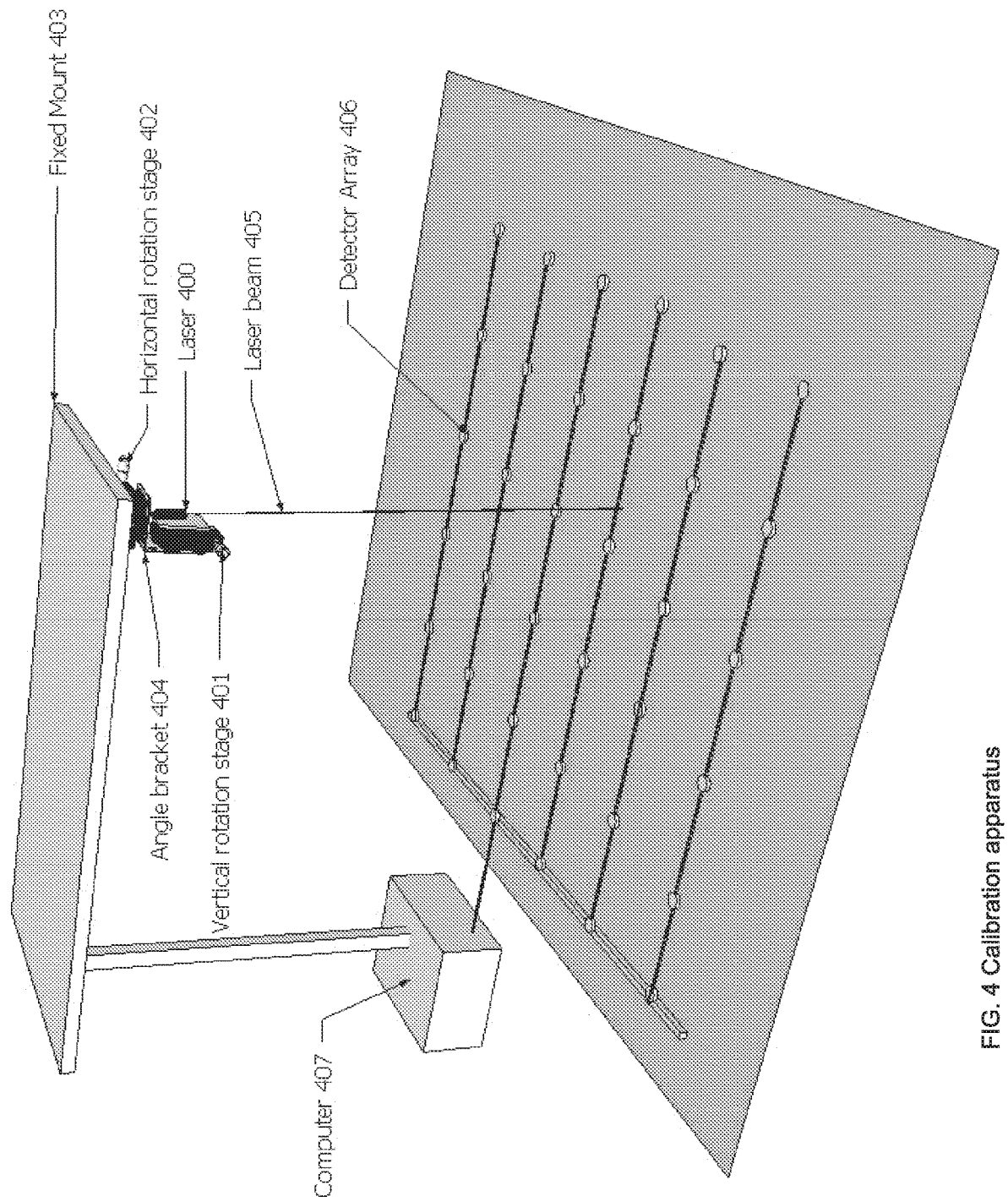
FIG. 4 Calibration apparatus

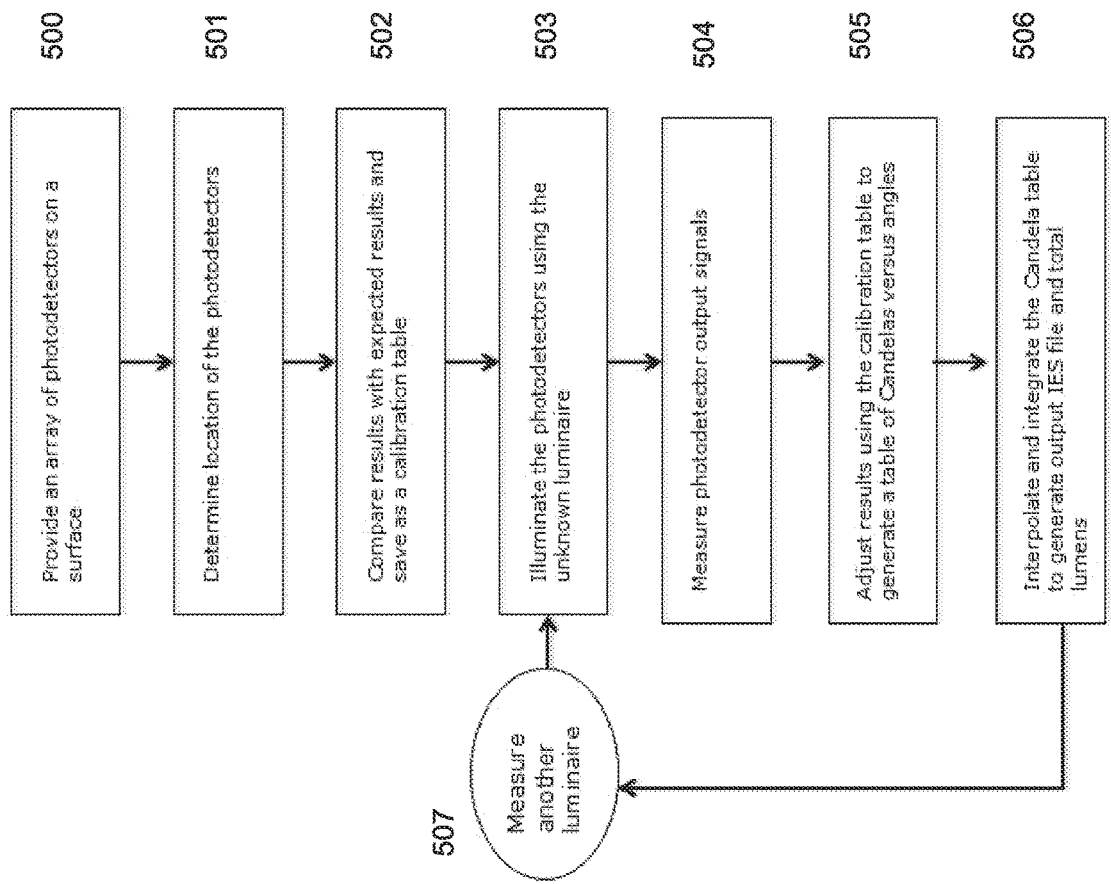
FIG. 5 Measurement Flowchart

METHOD AND APPARATUS FOR MEASURING ILLUMINATION CHARACTERISTICS OF A LUMINAIRE

RELATED APPLICATIONS

The present application is a Divisional of U.S. patent application Ser. No. 14/190,538, entitled "METHOD AND APPARATUS FOR MEASURING ILLUMINATION CHARACTERISTICS OF A LUMINAIRE" filed Feb. 26, 2014, the entire contents of which is hereby incorporated by reference.

BACKGROUND OF THE INVENTION

The invention relates generally to goniophotometers and integrating spheres for photometry, radiometry, spectroradiometry and/or colorimetry to measure the luminous intensity and luminous flux from various luminaires. More particularly, it relates to a method and apparatus for measuring the luminous intensity from a luminaire as a function of the viewing angle.

In the field of lighting system design it is necessary to know the luminous intensity emitted by a luminaire at all viewing angles from the luminaire. In particular, luminaires using light emitting diodes (LEDs) have custom-made lenses and reflectors designed to create a specific, controlled lighting distribution that is not homogeneous. Whenever a large area is to be illuminated and more than a single luminaire is required, the luminous intensity of the light emitted by each luminaire at various angles must be determined to assure the entire area is sufficiently illuminated. Thus, the system design requires a measurement device and method to determine the luminous intensity of the light emitted at different angles from a luminaire, and the total luminous flux emitted from the luminaire. Furthermore, luminaire vendors must specify these values for each of their products. Luminaire customers and regulatory agencies use the published values to compare different products, and ensure that the products meet required specifications. There is therefore a requirement for an apparatus and method to accurately measure the luminous intensity distribution and luminous flux of a luminaire.

The currently accepted device for determining the luminous intensity as a function of angle from the luminaire is a goniophotometer. This apparatus uses a single photodetector (for total light) or spectrophotometer (for color information). FIG. 1 shows one embodiment of the prior art goniometer wherein a luminaire 101 is mounted on a rotating mount 102 that is rotated around the horizontal axis 103 relative to the luminaire. The light from the luminaire is reflected off a rotating mirror 113 that is rotated around the vertical axis 104 relative to the luminaire. A spectrophotometer 106 behind an aperture 105 measures the light at the set horizontal and vertical angles. The goniophotometer is located inside a dark room 100 to prevent stray or reflected light from distorting the measurements. The goniophotometer measures the luminous intensity received on the detector at a given distance from the luminaire as the angle of viewing is varied by rotating the luminaire mount or mirror. In some implementations, one or two rotating mirrors between the luminaire, and detector are used to vary the angle. The luminous flux can be obtained by integrating the goniophotometer results over a reference sphere surrounding the luminaire. A common aspect of the prior art is that a single detector is used to measure the luminous intensity at separate angles while the angle of the detector relative to the luminaire is varied by mechanical means. The use of a goniophotometer required for official characterization of a luminaire can be traced to National Institute of Standards and Technology (NIST) standards with measurements done at Nationally Recognized Test Laboratories (NRTLs).

A goniophotometer has two significant limitations for commercial applications. A first significant limitation is the time required for measurement. The precise mechanical rotation together with the time required for a measurement with a single detector means that several hours of measurements are required to characterize one luminaire. A second disadvantage is cost. A large-scale goniophotometer requires large mechanical mounts with precision controls, resulting in a complete system costing on the order of $100,000.

These limitations make it difficult to quickly characterize luminaires at a reasonable cost during a lighting system design cycle. For example, if it is desired to compare several different LED lenses on a luminaire, each lens must be installed on the LEDs in the luminaire, the luminaire installed in goniophotometer, and then several hours of measurements taken for each lens.

There is therefore a need for a system and method to quickly characterize and compare luminaire designs during the design phase, without necessarily requiring NIST accuracy. The system presented here provides a low-cost, real-time measurement system and method to characterize luminaires.

Of interest in the prior art are patents on goniphotometers (U.S. Pat. Nos. 7,800,745 and 5,949,534 for example), integrating spheres (U.S. Pat. No. 6,721,048 for example), commercially available digital lux sensors from Intersil (part number ISL29023) and digital color sensors from AMS (part number TCS3472), and systems of networked sensors (U.S. Pat. No. 8,587,414 for example).

SUMMARY OF THE INVENTION

This invention provides an apparatus and a method that enable characterization of luminaires quickly and at relatively low cost. The system presented here provides a real-time measurement apparatus and method for the characterization of illumination data from unknown luminaires. In one embodiment, the apparatus for measuring the lighting characteristics of a luminaire having unknown characteristics includes a mounting location for mounting the luminaire and a surface proximate that is illuminated by the luminaire. An array of photodetectors is mounted on the surface and connected together by a bus or wireless network that enables data from the photodetectors to be provided to a processing unit. Light from the luminaire strikes the photodetectors, which provide data regarding characteristics of the light. In one embodiment the array of photodetectors is arranged in a grid pattern, and in another embodiment the photodetectors are arranged in a pattern where each is separated from nearby photodetectors by a specified angle with respect to the luminaire.

The system can be calibrated by illuminating the array with a luminaire having known illumination characteristics and creating a set of scaling factors to reflect differences between the known characteristics and the measured characteristics. First, a luminaire having known illumination characteristics is mounted at the specified location and the response of the array is measured. This measurement allows calibration of the photodetector array for a known condition. The luminaire having an unknown illumination distribution is then placed at the mounting location and the signal of the photodetectors is measured. The results can then be adjusted based on the array output for the known luminaire.

The method includes providing an array of photodetectors having known locations with regard to a mounting location. The locations of the photodetectors in the array with regard to the mounting location can be determined by standard measurement techniques. In another embodiment, a laser on an automated gimbal mount at the luminaire mounting point with digital protractor can be used to scan the laser beam over the array of detectors. Knowing the angle of the laser beam, the digital protractor reading, and the time of maximum output from an individual photodetector enables the locations of each photodetector to be known.

An embodiment method for measuring illumination characteristics of a first luminaire may include operations including providing a luminaire mounting location and one or more surfaces upon which an array of photodetectors may be disposed, each photodetector in the array having a known position, the surface being oriented to allow a luminaire at the luminaire mounting location to illuminate the array of photodetectors, determining, by a processor of a computer, responsiveness of the photodetectors in the array of photodetectors to illumination characteristics of the first luminaire, to thereby provide measured illumination data, and using, by the processor of the computer, calibration constants for each photodetector to calculate a luminous intensity at a horizontal angle and a vertical angle of each photodetector. In some embodiments, the method may further include interpolating the luminous intensity at intermediate angles between the photodetectors, and integrating the luminous intensity to obtain a luminous flux of the luminaire. In some embodiments, the known position of each photodetector in the array may be determined by mounting a light source at the luminaire mounting location, the light source providing a beam of light of a known orientation, scanning the beam of light over the array of photodetectors, the photodetectors being responsive to being illuminated and providing an output signal in response thereto, and saving, by the processor of the computer, information which correlates the known orientation of the beam of light with the output signals from the photodetectors to thereby obtain the position of the photodetectors with respect to the luminaire mounting location. In some embodiments, a second luminaire having known illumination characteristics may be mounted at the luminaire mounting location, and the method may further include determining, by the processor of the computer, responsiveness of the photodetectors in the array of photodetectors to the known illumination characteristics of the second luminaire, to thereby provide a calibration illumination data set, calculating, by the processor of the computer, calibration factors of each photodetector from the calibration illumination data set based on the known illumination characteristics of the second luminaire, and storing, by the processor of the computer, results of a comparison of measured output data in a computer system memory to thereby provide a set of scaling factors for each of the photodetectors. In some embodiments, photodetectors may measure total luminous intensity and color coordinates versus horizontal and vertical angles relative to the luminaire, and the computer may use the measured color coordinates to calculate a correlated color temperature of the luminaire.

An embodiment apparatus for characterizing lighting characteristics of a luminaire may include a mounting location for mounting the luminaire, one or more surfaces disposed in proximity to the luminaire so as to be illuminated by the luminaire, an array of photodetectors mounted on the one or more surfaces, and a processor coupled to the photodetectors so as to receive data from the photodetectors representative of illumination of the photodetectors by the luminaire and scale, interpolate, and integrate the data and save it in a known file format. In some embodiments, the array of photodetectors may be arranged in a grid pattern and the one or more surfaces may be substantially one or more planar surfaces. In some embodiments, the array of photodetectors may be arranged in a pattern on the one or more surfaces in which adjoining photodetectors may be separated by a uniform angle with respect to the luminaire. In some embodiments, each photodetector in the array may have a unique network address. In some embodiments, each photodetector in the array may be able to measure a total luminous intensity and color coordinates of an incident light as a function of a viewing angle.

Another embodiment method for measuring illumination characteristics of a first luminaire may include operations for providing a luminaire mounting location and one or more surfaces upon which an array of photodetectors, each having a location, may be disposed, determining, by a processor of a computer, the location of each of the photodetectors, mounting a second luminaire having known illumination characteristics at the luminaire mounting location, determining, by the processor of the computer, responsiveness of the photodetectors in the array of photodetectors to the known illumination characteristics of the second luminaire, to thereby provide a known illumination data set, determining, by the processor of the computer, scaling factors to compensate for at least locations of the photodetectors in comparison to apparatus used to determine the known illumination characteristics of the second luminaire, mounting the first luminaire at the luminaire mounting location, determining, by the processor of the computer, responsiveness of the photodetectors in the array of photodetectors to illumination characteristics of the first luminaire, to thereby provide a first luminaire, data set, and adjusting, by the processor of the computer, the first luminaire data set using the scaling factors to thereby provide the illumination characteristics of the first luminaire.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 2 is a diagram illustrating a preferred embodiment of the system;

FIG. 3 is a detailed drawing of a photodetector element;

FIG. 4 is a diagram illustrating an apparatus for determining the photodetector angles relative to the luminaire mounting position; and FIG. 5 is a flow chart illustrating calibration and measurement processes for the apparatus of FIGS. 1-4.

DETAILED DESCRIPTION OF THE PREFERRED EMBODIMENTS

Figure 1:
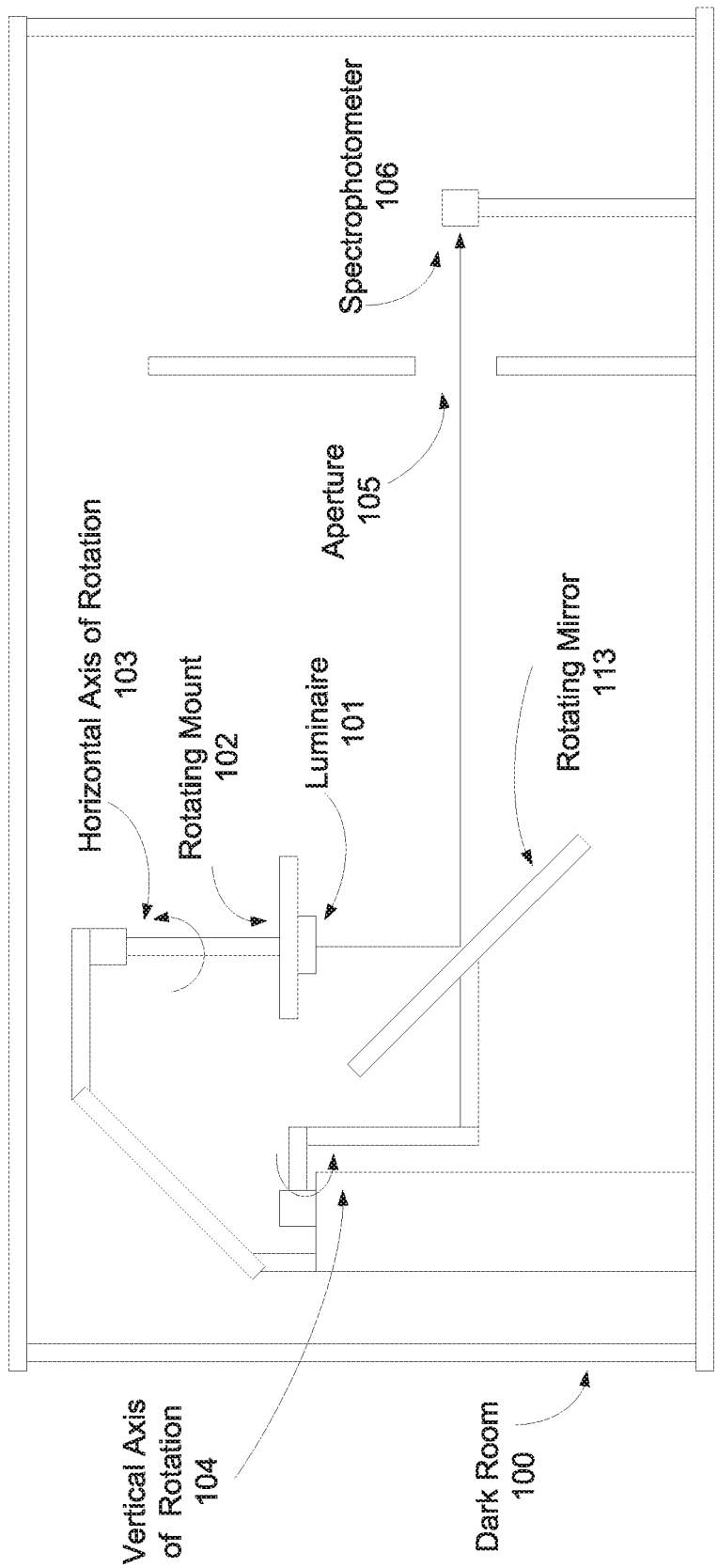
FIG. 1 illustrates a prior art goniophotometer.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

Background Terminology

The system described here provides measurements of illumination characteristics of lighting fixtures, or luminaires. As such certain terminology is used. The lux is a measure of illuminance and luminous emittance set by the International System of Units ("SI") described in terms of luminous flux per unit area. One lux is equal to one lumen per square meter.

A foot-candle is a non-SI unit of illuminance or light intensity widely used in the lighting industry, A "foot-candle" is the illuminance cast on a surface by a one-candela source positioned one foot away from the surface. It can also be defined as the illuminance on a 1-square foot surface having a uniformly distributed flux of one lumen. i.e. the amount of light that falls on a given surface. One foot-candle equals approximately 10.764 lux.

The candela is an SI defined unit of luminous intensity; that is, power emitted by a light source in a particular direction, weighted by the "luminosity function." The luminosity function is a standardized model of the sensitivity of the human eye to different wavelengths, sometimes also called the luminous efficiency function. A common candle emits light with a luminous intensity of roughly one candela. If an opaque barrier blocks emission in a direction, the emission is still approximately one candela in the directions that are not obscured.

The lumen is an SI derived unit of luminous flux, a measure of the total "amount" of visible light emitted by a source. Luminous flux differs from power (radiant flux). Luminous flux measurements reflect the varying sensitivity of the human eye to different wavelengths of light, while radiant flux measurements indicate the total power of all light emitted, independently from the eye's ability to perceive it. The lumen is defined in relation to the candela as 1 lumen equals=1 candela steradian. Because a sphere has a solid angle of $4\cdot\pi$ steradians, a light source that uniformly radiates one candela in all directions has a total luminous flux of 1 cd·$4\pi$ sr=$4\pi \approx$12.57 lumens.

Measurement System

FIG. 2 illustrates an embodiment of this invention of a system for characterization of luminaires, or other light emitting devices. As illustrated in the diagram, the luminaire 201 to be measured is mounted on a fixed mount 202 in a dark room 200. An array of low-cost photodetectors 203 is placed in the room at specified vertical angles 204, horizontal angles 205, and distances 207. The detector array 203 is connected to a computer 208 via a wired detector bus 209. The computer 208 may include at least a processor configured to perform various operations. In other embodiments photodetectors 203 can be coupled to the computer 208 using wireless technology. The array of photodectors 203 enables characteristics of light from the luminaire 201 to be measured at multiple locations without need for a goniophotometer.

As illustrated in FIG. 2, each photodetector 203 has a distinct position relative to the luminaire being studied. For example, a particular photodetector 206 will be a distance D from the luminaire, at a vertical angle 204 phi ($\Phi$) from the luminaire' vertical axis, and at a horizontal angle 205 theta ($\theta$) from the luminaire's horizontal axis. Thus the position of each photodetector from the luminaire can be characterized by an angle phi ($\Phi$) from the vertical an angle theta ($\theta$) from the horizontal, and distance D with respect to the luminaire.

The detectors can be connected to the controlling computer by one of several serial protocols supporting a shared bus with multiple addresses, such as the Inter-Integrated Circuit (I2C) bus, the Serial Peripheral Interface (SPI) bus, or Ethernet. Alternatively, a multi-address wireless protocol such as WiFi or Bluetooth can be used for the computer to request the data from each detector. With either a wired or wireless network, the computer can request the readings of each detector, store the values in a database, create an output file in a standard format, and show the results in a user interface. With the fixed mount, the time to obtain all readings and report the data is only limited by the network speed and processing time of the computer and is therefore much faster than a goniophotometer.

FIG. 3 shows details of the photodetector design. A detector module 300 has a photodetector element 302 with its viewing window 301 oriented towards the luminaire. The photodetector 302 can be a white-light device reporting lux or lumens, or a color device reporting the relative intensity of red, green, and blue colors. An example of a white-light photodetector is the Intersil ISL29023 Integrated Digital Light Sensor with Interrupt. This device has an internal 16-bit analog to digital converter (ADC) with 90 ms conversion time, and an output I2C interface. The ISL29023 reports its readings in lux, with a settable dynamic range covering 0.015 to 64,000 lux. An example of a color photodetector is the TCS3472 Color Light-to-Digital Converter with IR Filter from AMS. This device has a 3×4 photodiode array composed of red-filtered, green-filtered, blue-filtered, and clear (unfiltered) photodiodes that are connected to a 16-bit ADC. This device provides raw counts of each color with a dynamic range of 3,800,000:1. Each of these devices is commercially available with a retail price of less than three dollars (Reference www.digikey.com). The output of the detector is connected to a small microcontroller unit (MCU) 303 that encapsulates the sensor data and transmits it to the controlling computer 208 using the bus interface 305 or wireless antenna 306. The detector array can be powered by an embedded battery 304, or an external power source (not shown). Each detector in the array is assigned a unique address so that the controlling computer can correlate the position of the detector with its light reading. The detector module 300 may also include a mount element 307.

When the photodetectors 203 are first placed on the surface by the luminaire, their locations are only roughly known in relation to the mounting location for the luminaire. To obtain more precise location information, a measurement is made of the distance D, and angles $\Phi$ and $\theta$ from the luminaire to each photodetector using a digital protractor or other appropriate measuring apparatus, as described below. Each photodetector can be calibrated against a reference foot-candle or lux meter so that the photodetector reading can be converted to lux or foot-candles with appropriate adjustment for its distance and angle from the luminaire. A database of those values is stored within memory associated with the main computer 208. The calibration procedure is described next.

FIG. 4 illustrates one embodiment of apparatus for identifying the location of each of the photodetectors. For calibration, a laser 400 is mounted in the same position as the origin of the luminaire's axes with vertical rotation stage 401 connected with an angle bracket 404 to a horizontal rotation stage 402. The laser and rotation stages are mounted to the luminaire fixed mount 403 so that the laser beam 405 (or beam of light) is rotated about the luminaire's rotation axes. The rotation stages are rotated to direct the laser at each photodetector in the array 406. When each photodetector records a maximum value, the computer 407 stores the horizontal and vertical angles for that detector. The computer 407 can control an automated measurement where the rotation stages 401, 402 rotate the laser beam 405 across the photodetector array 406 at the same time the computer 407 queries the photodetector 406 responses. Equipment for scanning the laser beam across the photodetectors is well known. For example, a dual-axis digital laser protractor with orthogonal rotating mounts can step the laser beam through the desired calibration of angular position. The position of each photodetector, is obtained from the angles $\Phi$ and $\theta$ (see FIG. 3), at which photodetector has a maximum response to the laser beam 405. The responsive detector locations are then stored in memory associated with the CPU. This data provides the angular position of each photodetector. The distance of the laser to the detector array can be measured directly and then standard trigonometric formulas can be used to calculate the distance D of each detector from the laser and luminaire mounting point.

Once the location data of all photodetectors 406 has been stored, a luminaire with a known distribution, for example, one that has been measured at a reference laboratory, is placed at the luminaire mounting position, i.e. the location of the laser beam source used to create the map of photodetector locations. The response of all photodetectors to illumination from the luminaire is obtained and appropriate scaling factors saved in the computing system. Because the photodetectors are each at different distances from the luminaire (unlike the goniophotometer) an adjustment is necessary to compensate for the difference in intensity of light with distance from the luminaire. In addition the scaling factors also compensate for differences in sensitivity among the photodetectors. The degree of accuracy obtained by this calibration is acceptable for most commercial uses, particularly those where a slight decrease in absolute accuracy is acceptable in view of the time and cost savings. Once the position of each photodetector is known, and the intensity of the light at each photodetector from a reference illumination source is known, the apparatus may then be used to determine the illumination characteristics of an unknown luminaire.

To measure an unknown luminaire, the desired luminaire is secured at the mounting location 202 and then set to its desired measurement condition. The response of each photodetector to the illumination is then queried by the computer 208 and stored. The calibration table of scaling factors previously determined, combined with the new measured data from the photodetectors, enables creation of an output file of candelas versus angle for the luminaire being tested. If additional accuracy is desired, the measurement may be repeated multiple times and averaged. The table of Candela values versus angles can also be interpolated to estimate the Candela values at intermediate, unmeasured angles. Those skilled in the art will recognize that the table of Candela values versus angles can be interpolated and reformatted to generate an IES file. A lighting system designer preparing a multi-luminaire (or single luminaire) design can then use the IES files to design appropriate lighting for an area to be illuminated. The approach described enables an individual to relatively quickly determine how different design parameters affect luminaire performance, eliminating the costly system and lengthy procedure of the prior art.

In an alternate embodiment, rather than placing detectors in a regular grid pattern as illustrated in the FIG. 2, the detectors can be placed at specified angles in relation to the luminaire mounting location, for example, at 5-degree increments. In this implementation, the laser beam 405 is aimed at the specified angle, and then the appropriate photodetector is positioned on the wall or floor of the structure where the laser beam appears. Such a system may use a flexible mounting of the photodetectors so that their position can be adjusted, e.g. by providing a sliding mount for the height adjustment with perpendicular slotted mounts for adjustment of the photodetector position in a perpendicular direction, or by a willingness to fixedly attach the photodetectors to the surface.

The calculations performed to obtain the calibrated result are shown below. In the ($\Phi$, $\theta$, z,) coordinate system (see FIG. 3), the Candela at the measured angles for a distance D from the luminaire to photodetector that measures foot-candles:

$$Cd(\phi,\theta)=Fc(\phi,\theta,z)*D^2/\cos\phi$$

where the cos $\phi$ factor accounts for the angle between the detector normal and the light ray being measured. The response time of the measurements described above depends on the detector response time, the speed of the communications network between the detectors and CPU, the total number of detectors, and the CPU data processing time. Using commercially available detectors and CPU, the time to read and display the results from 100-1000 photodetectors is on the order of one minute, two orders of magnitude faster than the goniophotometer system. The resulting luminous intensity array (in Candelas per angle) can be integrated to obtain the total luminous flux (in lumens) of the light source, using the same algorithm used to obtain luminous flux from goniophotometer data.

FIG. 5 is a flow chart to illustrate the methods described above. The first step 500 in the process is to provide an array of photodetectors on a surface to detect illumination by a luminaire. Then, at step 501, using the approach described in conjunction with FIG. 4, the location of each photodetector with regard to the mounting location for the luminaire is determined. Next at step 502 a luminaire with known illumination characteristics, for example, as determined by a reference laboratory or other source, is mounted in the apparatus, and used to illuminate the photodetectors. The resulting output signals are compared with the expected output signals based on the known illumination characteristics from the reference laboratory. The differences between the expected data and the actual data are then used to create a calibration table of scaling factors, as shown by step 502. The luminaire with known lighting characteristics is then removed from the apparatus. At step 503, the luminaire, with unknown lighting characteristics is then mounted in the apparatus. The unknown luminaire is then turned on and the response of the photodetectors to it measured at step 504. The resulting data is then adjusted using the calibration table earlier determined, as shown by step 505. At step 506 the resulting table of Candelas versus the horizontal and vertical angles is (1) interpolated to generate an output IES file and (2) integrated to calculate total lumens of the luminaire. At step 507 the measurement procedure can be repeated on the same luminaire or with a different luminaire. In various embodiments, at least operations of blocks 501-502, 504-506 may be performed by a processor of a computer as described above.

The preceding has been a detailed description of a system for enabling faster, less costly determination of the lighting characteristics of a luminaire. Although numerous details have been provided with regard to the specific implementation of the system, it will be appreciated that the scope of the invention is defined by the appended claims.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Certain illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An apparatus for characterizing lighting characteristics of a luminaire comprising:
   a mounting location for mounting the luminaire;
   one or more surfaces disposed in proximity to the luminaire so as to be illuminated by the luminaire;
   an array of photodetectors mounted on the one or more surfaces; and
   a processor coupled to the photodetectors so as to receive data from the photodetectors representative of illumination of the photodetectors by the luminaire and scale, interpolate, and integrate the data and save it in a known file format;
   a second luminaire having known illumination characteristics mountable at the luminaire mounting location:
   the processor further coupled to the photodetectors so as to:
      determine a responsiveness of the photodetectors in the array of photodetectors to the known illumination characteristics of the second luminaire, thereby to provide a calibration illumination data set;
      calculate calibration factors of each photodetector from the calibration illumination data set based on the known illumination characteristics of the second luminaire; and
      store results of a comparison of measured output data in a computer system memory to thereby provide a set of scaling factors for each of the photodetectors.

2. The apparatus of claim 1, wherein the array of photodetectors is arranged in a grid pattern and the one or more surfaces are substantially one or more planar surfaces.

3. The apparatus of claim 1, wherein the array of photodetectors is arranged in a pattern on the one or more surfaces in which adjoining photodetectors are separated by a uniform angle with respect to the first luminaire.

4. The apparatus of claim 1, wherein each photodetector in the array has a unique network address.

5. The apparatus of claim 1, wherein each photodetector in the array can measure a total luminous intensity and color coordinates of an incident light as a function of a viewing angle.

6. A method for measuring illumination characteristics of a first luminaire at a luminaire mounting location, the first luminaire disposed in proximity to one or more surfaces to be illuminated by the first luminaire, the method comprising, at least:
providing a luminaire mounting location and a surface upon which an array of photodetectors, each having a location, is disposed;
determining, by a processor of a computer, the location of each of the photodetectors;
mounting a second luminaire having known illumination characteristics at the luminaire mounting location;
determining, by the processor of the computer, responsiveness of the photodetectors iii the array of photodetectors to the known illumination characteristics of the second luminaire, to thereby provide a known illumination data set;
determining, by the processor of the computer, scaling factors to compensate for at least locations of the photodetectors in comparison to an apparatus used to determine the known illumination characteristics of the second luminaire;
mounting the first luminaire at the luminaire mounting location;
determining, by the processor of the computer, responsiveness of the photodetectors in the array of photodetectors to illumination characteristics of the first luminaire, to thereby provide a first luminaire data set; and
adjusting, by the processor of the computer, the first luminaire data set using the scaling factors to thereby provide the illumination characteristics of the first luminaire.

7. The method of claim 6, wherein the array of photodetectors arranged in a grid pattern and the one or more surfaces are substantially one or more planar surfaces.

8. The method of claim 6, wherein the array of photodetectors is arranged in a pattern on the one or more surfaces in which adjoining photodetectors are separated by a uniform angle with respect to the first luminaire.

9. The method of claim 6, wherein each photodetector in the array has a unique network address.

10. The method of claim 6, wherein each photodetector in the array can measure a total luminous intensity and color coordinates of an incident light as a function of a viewing angle.

11. A non-transitory machine-readable medium including instructions which, when read by a machine, cause the machine to perform operations for measuring illumination characteristics of a first luminaire at a luminaire mounting location, the first luminaire disposed in proximity to one or more surfaces to be illuminated by the first luminaire, the instructions comprising, at least:
determining, by a processor of a computer, the location of each of an array of photodetectors disposed on a surface;
mounting a second luminaire having known illumination characteristics at the luminaire mounting location;
determining, by the processor of the computer, responsiveness of the photodetectors in the array of photodetectors to the known illumination characteristics of the second luminaire, to thereby provide a known illumination data set;
determining, by the processor of the computer, scaling factors to compensate for at least locations of the photodetectors in comparison to an apparatus used to determine the known illumination characteristics of the second luminaire;
mounting the first luminaire at the luminaire mounting location; determining, by the processor of the computer, responsiveness of the photodetectors in the array of photodetectors to illumination characteristics of the first luminaire, to thereby provide a first luminaire data set; and
adjusting, by the processor of the computer, the first luminaire data set using the scaling factors to thereby provide the illumination characteristics of the first luminaire.

12. The non-transitory machine-readable medium of claim 11, wherein the array of photodetectors is arranged in a grid pattern and the one or more surfaces are substantially one or more planar surfaces.

13. The non-transitory machine-readable medium of claim 11, wherein the array of photodetectors is arranged in a pattern on the one or more surfaces in which adjoining photodetectors are separated by a uniform angle with respect to the first luminaire.

14. The non-transitory machine-readable medium of claim 11, wherein each photodetector in the array has a unique network address.

15. The non-transitory machine-readable medium of claim 11, wherein each photodetector in the array can measure a total luminous intensity and color coordinates of an incident light as a function of a viewing angle.

* * * * *